(12) United States Patent
Brand et al.

(10) Patent No.: US 9,792,337 B2
(45) Date of Patent: Oct. 17, 2017

(54) IN-DATABASE CONNECTIVITY COMPONENTS ANALYSIS OF DATA

(71) Applicant: Pivotal Software, Inc., Palo Alto, CA (US)

(72) Inventors: Michael Brand, Bentleigh East (AU); Florian Schoppmann, San Francisco, CA (US); Chunsheng Fang, Redwood City, CA (US); Jarrod James Vawdrey, Atlanta, GA (US); Emily Kawaler, Ames, IA (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 15/253,745

(22) Filed: Aug. 31, 2016

(65) Prior Publication Data

US 2016/0371349 A1 Dec. 22, 2016

Related U.S. Application Data

(63) Continuation of application No. 14/802,934, filed on Jul. 17, 2015, now Pat. No. 9,465,854, which is a continuation of application No. 13/804,340, filed on Mar. 14, 2013, now Pat. No. 9,116,970.

(51) Int. Cl.
*G06F 17/30* (2006.01)
*G06F 7/58* (2006.01)
*G06F 15/16* (2006.01)

(52) U.S. Cl.
CPC .......... *G06F 17/30569* (2013.01); *G06F 7/58* (2013.01); *G06F 17/3053* (2013.01); *G06F 17/30958* (2013.01); *G06F 2207/58* (2013.01)

(58) Field of Classification Search
None
See application file for complete search history.

(56) References Cited

U.S. PATENT DOCUMENTS

| 7,010,789 B1 | 3/2006 | Kimelman et al. |
| 9,116,970 B2 | 8/2015 | Brand et al. |
| 2012/0192138 A1 | 7/2012 | Delling et al. |
| 2014/0280202 A1 | 9/2014 | Brand et al. |

OTHER PUBLICATIONS

International Search Report and Written Opinion in International Application No. PCT/US2014/028142, dated Jul. 14, 2014, 10 pages.
Karger et al. "Fast Connected Components Algorithms for the EREW PRAM", Department of Computer Science, Stanford University, NSF Grant CCR-9010517, Jul. 1, 1977.
Rotta, "A Multiple-level Algorithm for Modularity Graph Clustering," Jun. 30, 2008, http://www-docs.tu-cottbus.de/informatik/public/abschlussarbeiten/rotta_da_2008.pdf, 107 pages.

*Primary Examiner* — Alex Gofman
(74) *Attorney, Agent, or Firm* — Fish & Richardson P.C.

(57) ABSTRACT

A method determines the connectivity components defined by a set of relations over a set of data elements. For each first data element of a selected subset of data elements, a second data element that is linked to the first data element by a path of relations is selected as its representative, using a randomization process. A new set of relations is created by replacing each first data element of the subset by its representative in at least part of the set of relations.

18 Claims, 8 Drawing Sheets

IN-DATABASE CONNECTIVITY COMPONENTS ANALYSIS OF DATA

RELATED APPLICATION

This application is a continuation of U.S. patent application Ser. No. 14/802,934, filed Jul. 17, 2015, which is a continuation of U.S. patent application Ser. No. 13/804,340, filed on Mar. 14, 2013, entitled "In-Database Connectivity Components Analysis of Data," which is hereby incorporated by reference in its entirety.

BACKGROUND

This invention generally relates to the analysis of large volumes of data to identify and analyze groups of data elements that are related, and more particularly to characterize the data in a large data set using graph and connected components data analytical approaches to partition the data into subsets of data elements that are related.

There are classes of data processing problems where it is desirable to analyze a data set to characterize subsets of the data according to relations between data elements. As an example, a telephone company ("Telco") that has a large group, e.g., a million, subscribers may wish to map out patterns in which its subscribers call one another in order understand better their behaviors and to optimize the Telco's service and profits. In order to do this, the Telco needs to identify subsets of subscribers that call one another to construct the mapping patterns. As another example, a candidate for political office with limited resources may wish to decide how best to allocate these resources during a campaign. Assume that the campaign organization may have determined that people vote in peer groups, and wants to focus on swing voters, but does not have sufficient resources to telephone, visit or otherwise contact every prospective voter in each swing voter peer group. The campaign organization may decide to target the peer groups according to size from largest to smallest in size, and in any event may want only one representative from each peer group to be its evangelist to influence the other voters in the peer group.

The problem in each case is how to identify the subsets of related data elements (i.e., subscribers or voters) efficiently in a much larger set of data elements. Additionally, in the voter example, it is also necessary to characterize peer groups according to their sizes as well as to identify for each peer group a representative voter. One approach to analyzing such data to obtain the desired information is to use well-known graph theory and connectivity components data analytics. A graph is an object that describes a relation between pairs of data elements ("vertices") in a set. The pairs exhibiting the relation are referred to as "edges". Each pair of data elements that belongs to the underlying set either exhibits or does not exhibit the relation. For example, the data elements in both of the foregoing examples are "persons", and the relationship may be "friendship". Thus, the persons of each pair are either friends or not. Two data elements ("vertices") in a graph are "connected" if there is a path of "edges" (relations) linking them. A connectivity component is a subset of data elements of the graph that are pair-wise connected such that no additional element can be added that is connected to any of the data elements of the subset, i.e., subscribers or voters of a subgroup or peer group of the larger group that are "friends". Subsets of persons can be identified in the foregoing examples by using graph theory to characterize the data elements (subscribers or voters) as being within connectivity components.

The connected components problem for a graph is the problem of partitioning the larger set of vertices (data elements) of the graph into connectivity components, i.e., identifying subsets of data elements that are related. It has been handled in different ways that are not practical for real world mass data analysis. A common approach for finding connectivity components is to use the well-known "Union-Find" algorithm for disjoint data structures. This algorithm involves a "find" operation to determine in which of a plurality of subsets a particular data element is located, and a "union" or join operation to combine two subsets into a single subset. However, this approach is not practical with large data sets. As the size of the data set increases, storage and retrieval quickly become increasingly slower and very inefficient. The Union-Find algorithm also requires access to many distant and hard to anticipate data items in every operation. Accordingly, even though a computer may be able to access a limited number of data items quickly, because of the large number of accesses required, the operations are exceedingly slow.

A different approach to finding connectivity components in a graph is one that requires the computer to make random choices, as described by Karger, David R., et al. in "Fast Connected Components Algorithms for the EREW PRAM", Department of Computer Science, Stanford University, NSF Grant CCR-9010517, Jul. 1, 1977, available at people.csail.mit.edu/karger/Papers/conn-components.pdf. This algorithm requires the use of an exclusive-read, exclusive-write (EREW) PRAM, which is a theoretical computational model that is far more powerful than any real computer. As such, it is only a mathematical curiosity and is impractical to implement. For practical connectivity component analysis, randomness has so far not been utilized.

Moreover, large data graphs are stored in large data stores (databases), for which data access is allowed only in ways describable using a database language, e.g., Structured Query Language (SQL), interface. For solving the connected components problem, present methods of using an SQL interface are impractical. One such method, for example, would be to use SQL JOINs in order to calculate first the connectivity of each vertex to all vertices that are two edges away from it, then those that are three edges away from it, and so on. However, for a graph that has a very long path comprising, e.g., a million data elements where element $x_0$ is connected to $x_1$ which is connected to $x_2$ which is connected to $x_3$, etc., up to $x_{999999}$, to ascertain that two elements $x_i$ and $x_j$ both belong to the same connectivity component would require a prohibitively large number of JOIN operations over large tables, and would be exceedingly slow. Another SQL approach would be to first map out all pairs of data elements that are at most two relations apart, then those that are four relations apart, etc. While this requires fewer SQL passes over the data, the intermediate data that needs to pass between stages is exceedingly large, many times the size of the original data, rendering it impractical.

It is desirable to provide analytical approaches for partitioning large data sets in a database into connectivity components that avoids the foregoing and other problems with other known approaches, and it is to these ends that the present invention is directed.

BRIEF DESCRIPTION OF THE DRAWINGS

FIG. 4, comprising

DESCRIPTION OF PREFERRED EMBODIMENTS

This invention is particularly well adapted for use with large distributed database systems used, for example, for data warehousing or transaction processing, and will be described in that context. It will be appreciated, however, that this is illustrative of only one utility of the invention, and that the invention has applicability to other types of data processing systems.

Figure 1:
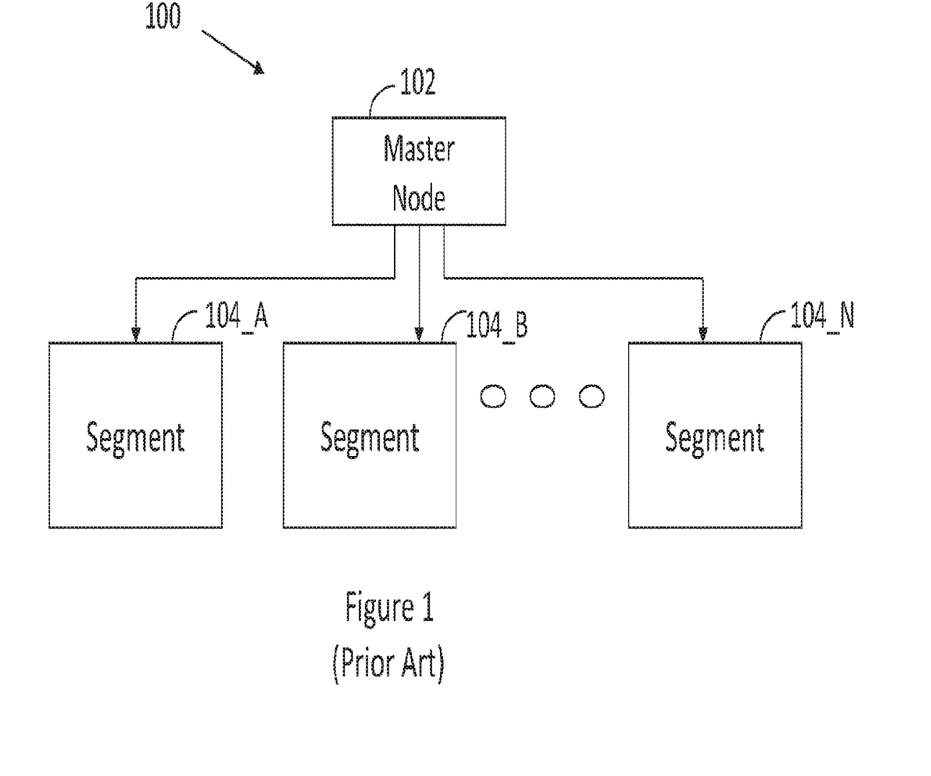
FIG. 1 is a diagrammatic view of a distributed database system of the type to which the invention may be applied.

FIG. 1 illustrates the architecture of one type of distributed parallel database system 100 with which the invention may be employed. The distributed database system shown is a shared-nothing distributed parallel database system. The database system may include a master node 102 which connects to a plurality of parallel-connected segment nodes 104_A through 104_N. Each segment node may comprise one or more database (DB) segments (database instances), including one or more primary databases and one or more mirror databases. The master and segment nodes may comprise generally similar server systems having similar general architectures and process models. The segment nodes operate together to process in parallel user requests (queries) and return results. All nodes must work together and function properly to process workloads.

Figure 2:
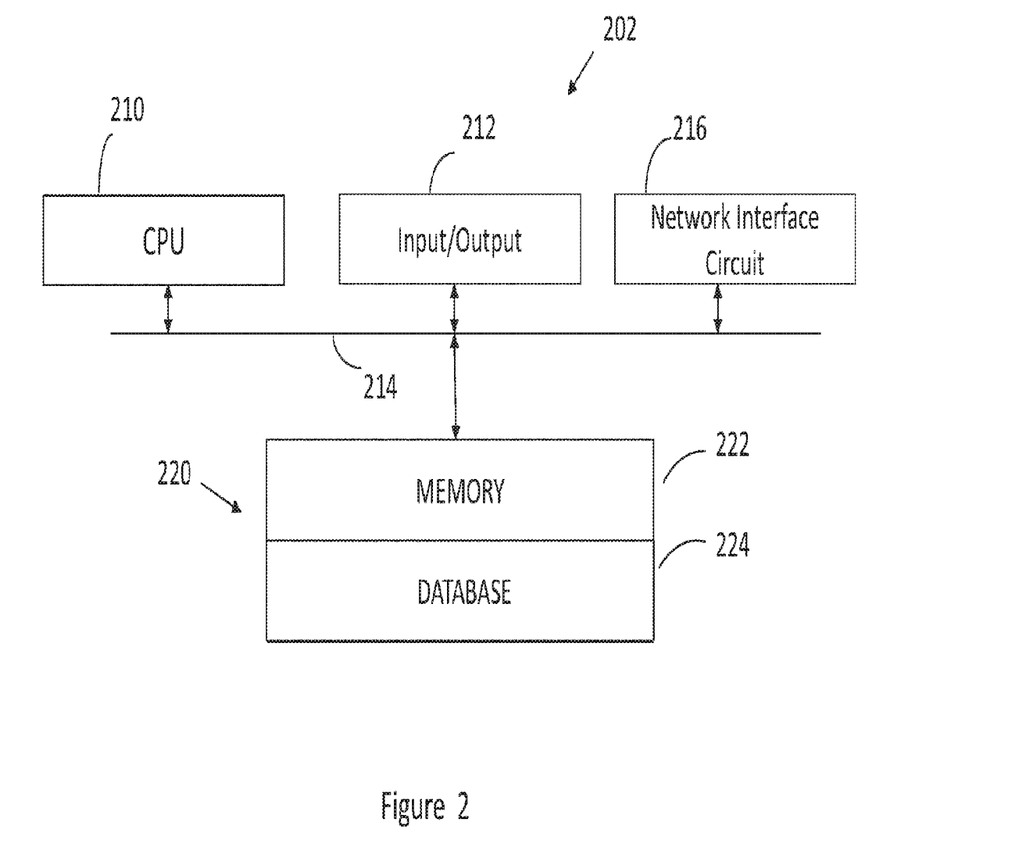
FIG. 2 illustrates the architecture of a node of the database system of FIG. 1.

FIG. 2 illustrates an example of the architecture of a master node 202 of the database system 100 that is configured to perform processes and operations in accordance with the invention. The master node and the segment nodes may have substantially similar architectures. The master node 202 may comprise a host computer server system 210 (which may comprise a single CPU or which may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in a networked environment. The master node may further have storage 220 comprising non-transitory physical storage media connected to the bus that embodies executable instructions, such as an operating system and application programs, to control the operations of the computer system. Storage 220 may include a memory 222 for storing executable instructions that control the CPU to operate in accordance with the invention, as will be described, and may contain other storage 224 including a database for storing, in addition to user data, system configuration information, logs, applications, utilities, and the like.

As will be described, the invention affords a computer implemented algorithm (process) for processing a set of data elements in a database using graph and connectivity components data analysis techniques to characterize the data and derive information about the data set. More particularly, the invention uses an improved approach to connectivity components data analysis that is practical and operates within a database or within a distributed file system without requiring large data movements or large memory to partition the data into subsets comprising clusters of related data elements according to the relations between the data elements in order to determine information about the relations. The connectivity components data analysis process of the invention replaces first data elements of a data set (graph) by second data elements ("representatives"), these being data elements known to belong to the same connectivity component. This is done by choosing as a representative for each first data element a second data element from among the set of data elements that includes the first data element and those data elements linked to the first data element by a path of relations (edges), and creating a new, and preferably contracted, set of relations, by taking each relation between data elements in the original graph to be a relation between the representatives of said data elements. Repeating the process recursively ultimately results in a new set of relations comprising only relations that are between a data element and itself. Connectivity components in the original input set are determined by removing relations from the set of relations to produce an empty set.

Representatives are preferably chosen at each iteration of the process so as to minimize the total number of representatives required, thus ensuring that the graph is contracted at an optimal rate. In essence, it is desirable that every data element which was chosen as a representative be chosen again and again so that it represents the maximum possible number of other data elements. Done in a conventional way, this is a serial process and is unsuitable for parallel implementation (as in database querying or distributed file system processing). However, the inventive process may employ distributed computation and is suitable for parallel processing in a distributed file system or a database. One of the principal innovations of the invention is in recognizing that choosing the representatives in a conducive way to achieve the foregoing objective of contracting the graph quickly can be accomplished using randomization. A randomization algorithm in accordance with the invention chooses representatives in a way that contracts the set of data elements quickly by making choices that are correlated in a way that biases some data elements to be chosen repeatedly as representative data elements, whereas other data elements are biased to never be chosen. In one embodiment of the invention, each data element is associated with a randomly chosen real number between 0 and 1. In a preferred embodiment, the representative for each first data element is chosen as the data element with the highest number among the group of data elements that includes the first data element and those data elements connected to the first data element by a relation. The data elements whose associated real numbers are close to one (1) are biased towards being picked many times, whereas those whose real numbers are close to zero (0) are biased never to be picked. This renders the inventive process practical for large data sets and large data stores. In addition to identifying the connectivity components, extensions of the invention can provide information as to the sizes and constituents of each connectivity component.

Advantageously, the process of the invention typically requires linear memory (either deterministically or in expectation, i.e., on average, depending on the embodiment), and runs in an expected logarithmic number of database queries entirely within a database without the necessity of data movement in or out of the database. Moreover, it is efficient in a SQL implementation, and as such is practical for the analysis of large real-world data sets (graphs), making it practical for large data stores.

Figure 3:
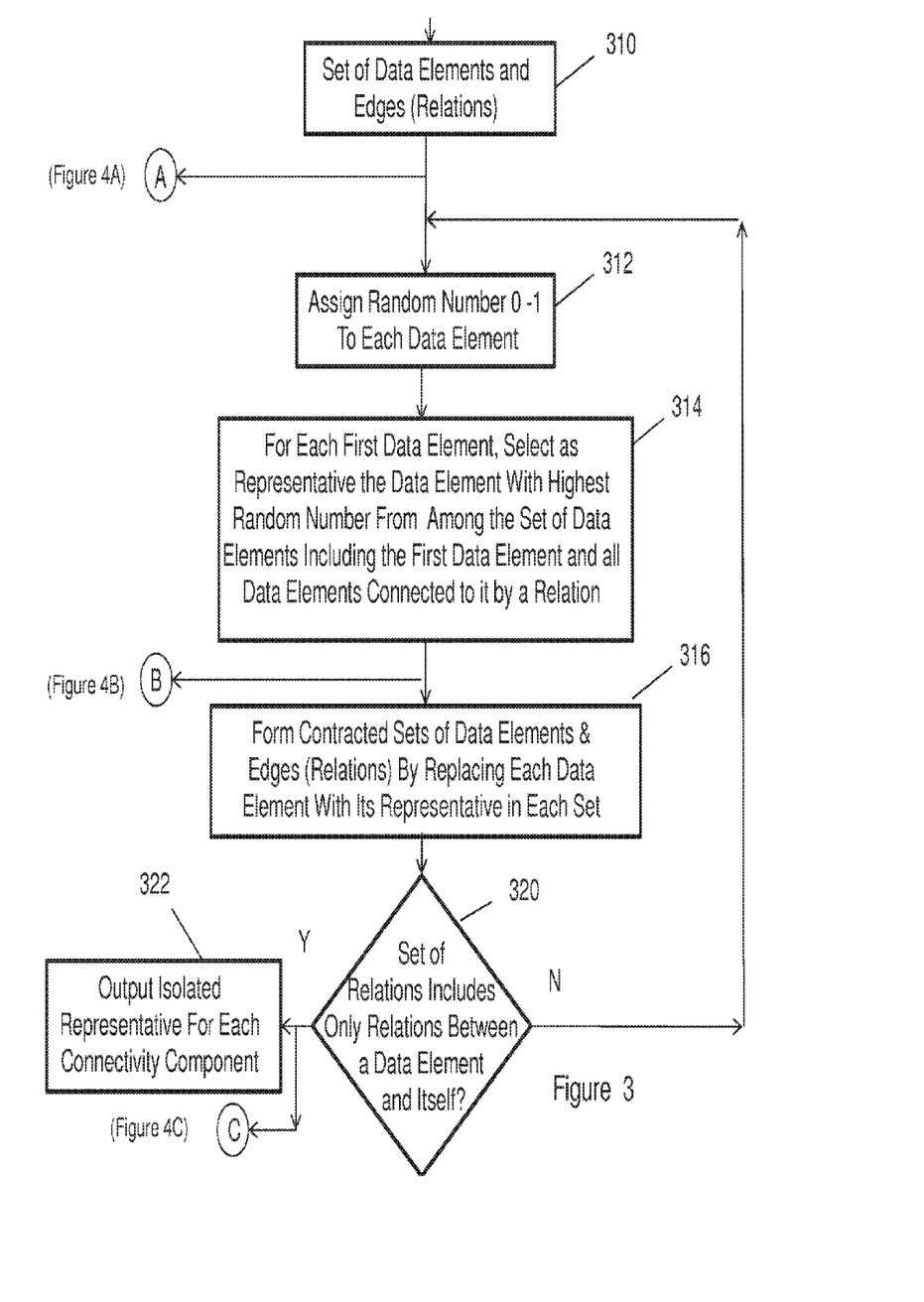
FIG. 3 is a diagrammatic view of a process for processing data elements in accordance with an embodiment of the invention to perform connected components data analysis.
Figure 4A:
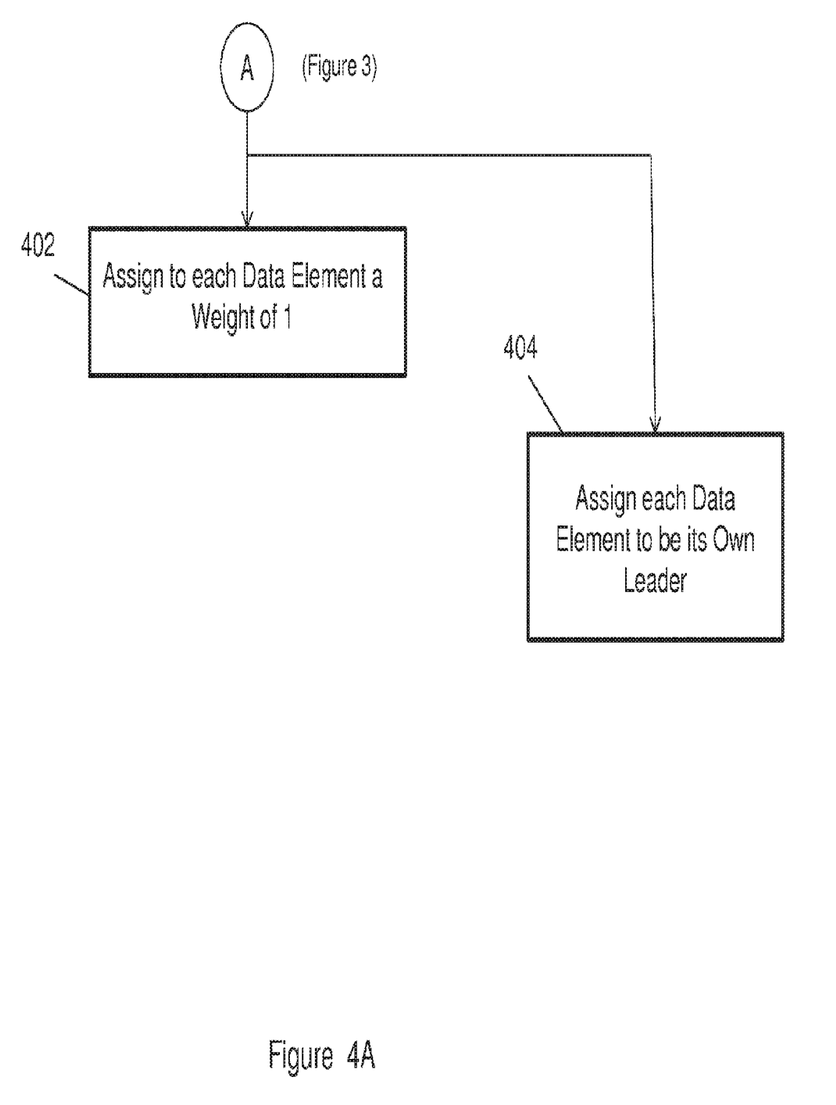
FIGS. 4A-C, is a diagrammatic view of embodiments of extensions of the process of FIG. 3.
Figure 4B:
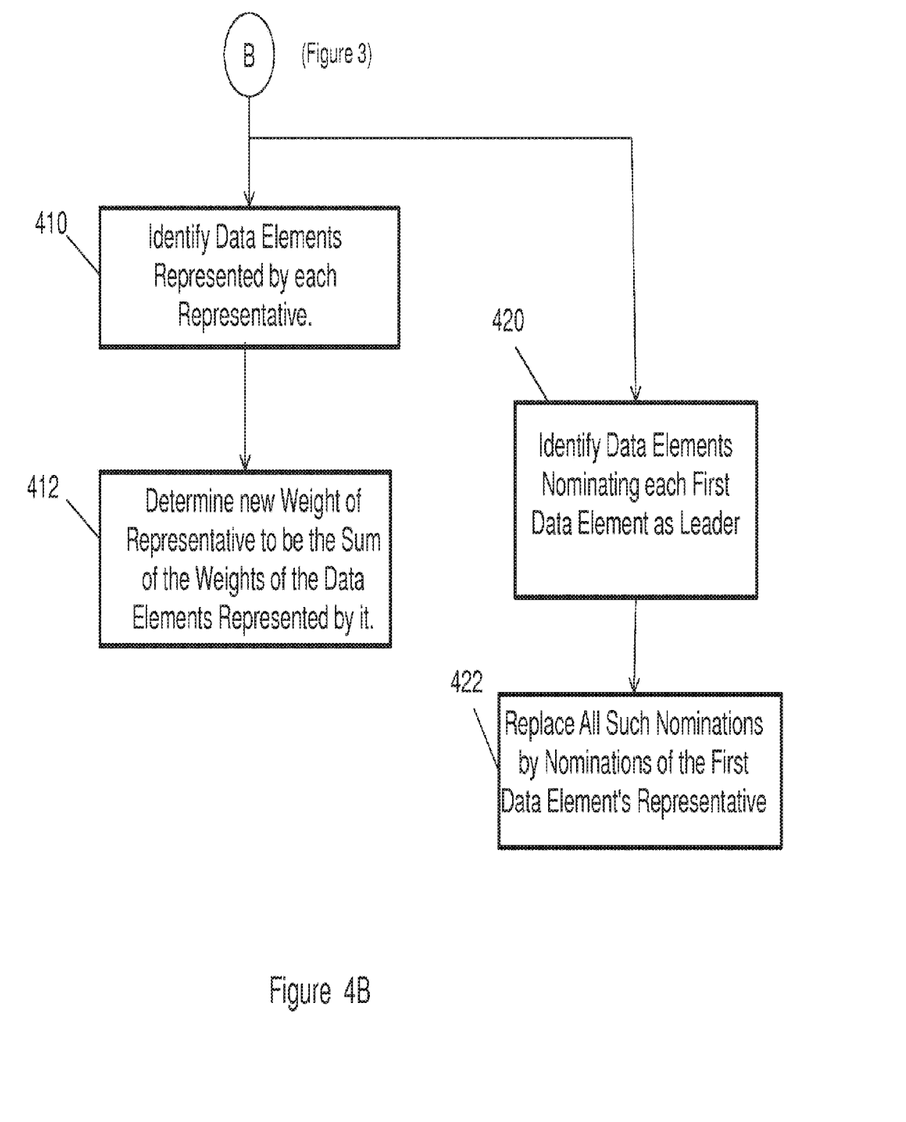
Figure 4C:
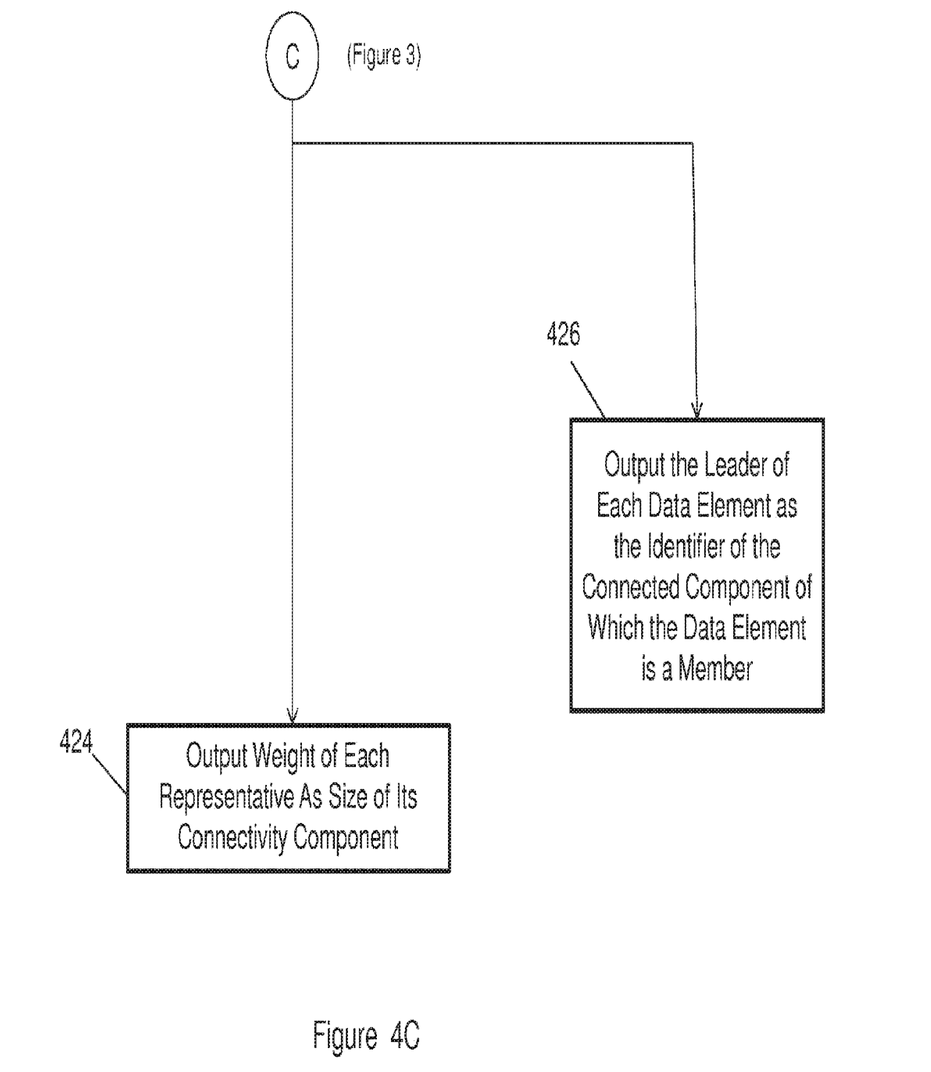

FIGS. 3 and 4 illustrate a preferred embodiment of a connectivity components data analysis algorithm in accordance with the invention that may run on the nodes of a database, such as the node 202 (FIG. 2) of the database system 100 of FIG. 1. The process of FIG. 3 applies graph theory and connectivity components analysis techniques to an input data set to identify connectivity components. FIGS. 4A-C illustrate embodiments of optional extensions to the process of FIG. 3 that enable the sizes of the connectivity components to be determined and that enable the constituent data elements in each connectivity component to be identified.

The input data set may be, for example, subscribers of a telephone company (Telco), or voters in a race for political office, as described above. The objective of the Telco's analysis may be to understand its subscriber base and subscriber calling habits. The objective of a political candidate's campaign organization may be to identify and classify peer groups of voters by size, and to identify a representative of each group to whom their message may be directed. In both cases graph theory and connectivity components analysis processes in accordance with the invention may be employed. In the description which follows, graph theory terminology will be used at times in describing the connectivity components data analysis process of the invention.

As described previously, a graph is an object that describes a relation between pairs of elements in a set. The underlying elements in a graph are "vertices" and the pairs exhibiting the relation are "edges". In graph theory terms, a graph G is a pair (V, E), where V is the set of vertices, and E is the set of edges (relations between vertices). In the data context, data elements are analogous to vertices, and two data elements of a set are related ("connected") if there is a path of edges linking them. A connectivity component is a subset of the data elements of a data set that are pair-wise connected such that no other data element can be added that is connected (related) to any of the data elements of the subset.

In accordance with the invention, an original graph G may be contracted to form a new graph G'=(V', E') that is smaller in both the number of vertices and the number of edges, but which preserves the essential connectivity component structure, by choosing for each vertex a "representative" in the new graph that is a member of the original vertex's connectivity component. Two representatives are connected by an edge in the new graph G' if they are representatives of vertices that were connected by edges in the original graph G. Any representative that is not connected to any other representative in G' is an "isolated" representative and represents a connectivity component that is a "final result".

FIG. 3 illustrates a preferred embodiment of a process in accordance with the invention for determining the connectivity components defined by a set of relations over a set of data elements. Referring to FIG. 3, the process may begin at 310 with a set of data elements and associated edges or relations between pairs of data elements. At 312, a random number, between 0 and 1, for example, is assigned to each data element of the input data set. As will be appreciated, the "random" numbers produced by real computers are actually pseudorandom numbers that are generated by a pseudorandom process. As used herein, the term "random numbers" refers to both truly random numbers, e.g. from a physical source of randomness, and to pseudorandom numbers. This "randomization" of data elements is a relatively quick, efficient, low-cost process for a computer to perform with only small memory requirements since it does not require any data movement, as would, for example, sorting the data elements randomly. At 314, a representative is selected for each data element. The selected representative is preferably the data element with a predetermined random number position (such as the highest random number) among the group of data elements that includes that original data element for which the representative is being selected and all data elements that share an edge with it. The representative replaces the first data element. The result of step 314 is the formation at step 316 of a contracted (smaller) set of data elements and a contracted set of edges (relations). The contracted set of data elements at 316 comprises the set of representatives. The contracted set of edges at 316 comprises the relations between distinct data elements that are representatives of data elements that were connected by an edge (related) in the input set.

The set of steps 310-316 of FIG. 3 comprise a first part of the algorithm that takes input sets of data elements and edges and forms contracted (smaller) sets of data elements and edges that maintain the characteristics of the input sets. The remaining steps 320-324 comprise a second part of the algorithm that finds the connectivity components in the input sets.

Continuing in FIG. 3 at 320, if the contracted set of relations from 316 is empty, meaning that there are no directly connected data elements in the contracted set of representatives but rather only isolated representatives, the isolated representatives are output at 322 as the representatives of the connected components in the input set, and are a final result. However, if the contracted set of relations is not empty, meaning that there are still directly connected representatives in the contracted sets, the process is repeated beginning at 310. The process of FIG. 3 is iterated until the set of relations at 320 is empty and there are only isolated (unconnected) representatives of data elements remaining. These isolated representatives represent and correspond to the connectivity components in the input set. They are output at 322, and the process terminates.

The result of the process of FIG. 3 is to transform input sets of data elements and edges into smaller contracted sets of representatives and edges, and ultimately to an isolated representative for each connected component in the original input set of data elements. The randomization of data elements according to the invention ensures that the number of data elements decreases "in expectation" (on average) by some fraction for each iteration of the process of FIG. 3. The result is that the algorithm requires only a logarithmic number of passes over the data in expectation, meaning that the algorithm is fast, while still requiring only an amount of memory comparable with the original data set. Moreover, the algorithm has practical applicability because it can be implemented over SQL, meaning that it can be run within the database and not require data to be moved in or out of the database. Moreover, in a parallel distributed database as illustrated in FIG. 1, SQL queries are parallelized over the data and run in substantially constant time regardless of how much data is in the database, and queries run efficiently in cost and time. The algorithm capitalizes on this parallelism by minimizing the number of passes over the data.

In accordance with a further embodiment, the individual data elements may nominate a leader for their (yet to be determined) connected component. This leader is initially the data element itself. When a data element is replaced by a representative, all data elements that nominated said data element as the leader of their connected component now change their nominations so that, instead, they are nominating the representative that replaced it. The ultimate result of this nomination scheme is that at the end of the process, when the set of relations is empty, each connected component has a distinct single leader, which is the nominated leader of all the data elements constituting said connected component.

FIGS. 4A-C illustrate extensions of the algorithm of FIG. 3 in accordance with other embodiments of the invention where it may be desirable to determine the size of each connected component in the input data set and to identify the data elements included within each connectivity component. In an embodiment, following step 310 of FIG. 3, the algorithm may branch at "A" to the process illustrated in FIG. 4A. As shown in FIG. 4A, at step 402 each data element in the original input data set may be assigned a weight of "1", and at 404 may be assigned to be its own leader. Following step 314 (FIG. 3), the process may branch to "B" (FIG. 4B), where at 410, the data elements represented by each representative may be identified, and at 412 a new weight of the representative may be determined to be the sum of the weights of the data elements represented by it. Additionally, at 420 the data elements nominating each first data element as leader may be identified. At 422 all such nominations may be replaced by nominations of the first data element's representative. Returning to FIG. 3, when the result of step 320 is that the set of relations includes only relations between a data element and itself, the process may branch to "C" (FIG. 4C). Referring to FIG. 4C, at 424 the process may output the weight of each representative as the size of its connectivity component, and at 426 the process may output the leader of each data element as the identifier of the connectivity component of which the data element is a member.

Figure 5A:
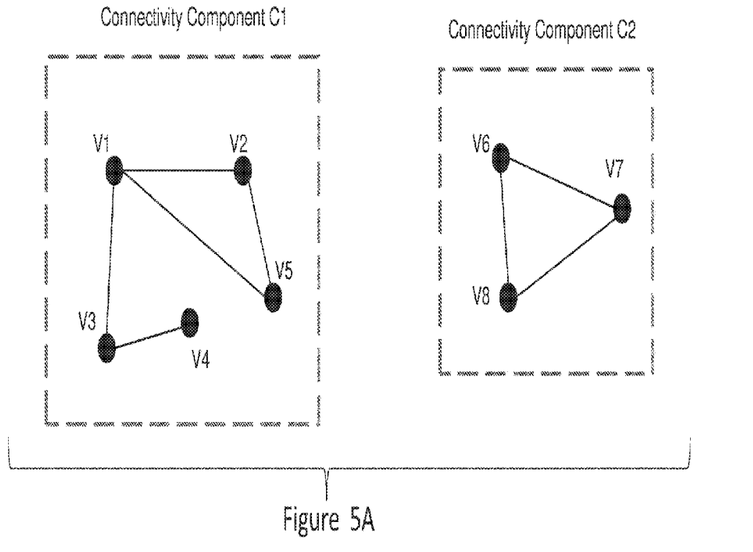
FIGS. 5A-D are diagrammatic views that illustrate an example of a sequence of steps in accordance with the process of FIG. 3 for partitioning a data set into connectivity components.

FIGS. 5A-D are diagrammatic views that describe an example of the algorithm of FIG. 3 in the context of graph and connectivity component approaches. FIG. 5A illustrates an input set of vertices (data elements), V1-V8, and an input set of edges, i.e., indications represented by lines that two vertices share a relation. The set of edges in FIG. 5A are (V1, V2), (V2, V5), (V1, V5), (V1, V3), (V3, V4), (V6, V7), (V6, V8) and (V7, V8). As shown, vertices V1-V5 are linked by a path of edges and ultimately will be determined to constitute a first connectivity component C1. Vertices V6-V8 are also linked by a path of edges and constitute a second connectivity component C2. The set of vertices and the set of edges depicted in FIG. 5A correspond to the input sets in step 310 of FIG. 3. The indications of the assignment to connectivity components, C1 and C2, are the desired outputs of the process.

Figure 5B:
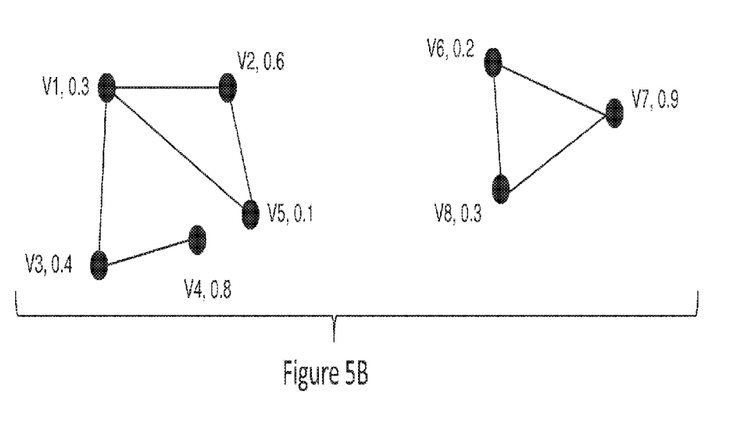

Each vertex V1-V8 is assigned a random number between 0 and 1, as indicated in step 312. For example, assume that the random numbers assigned to the vertices are V1=0.3, V2=0.6, V3=0.4, V4=0.8, V5=0.1, V6=0.2, V7=0.9 and V8=0.3. This is shown in FIG. 5B.

Corresponding to step 314, each vertex is replaced by another vertex. The process may select as a replacement for a vertex that vertex with the highest random number from among the set of vertices including itself and all vertices that share an edge with it. The selected vertex will be the representative of the original vertex it replaced. Referring to FIG. 5B, for vertex V1, the process selects V2 to replace and represent V1, since V2 has the highest random number among the group of vertices V1, V2, V3 and V5. Although V4 has the highest random number in C1, it does not share an edge with V1, and, therefore, is not selected as the representative of V1. In a similar way, vertex V2 will be selected to represent itself and V5, while V4 will be selected to represent both itself and V3. V7 will be selected to represent V6, V8 and itself.

Figure 5C:
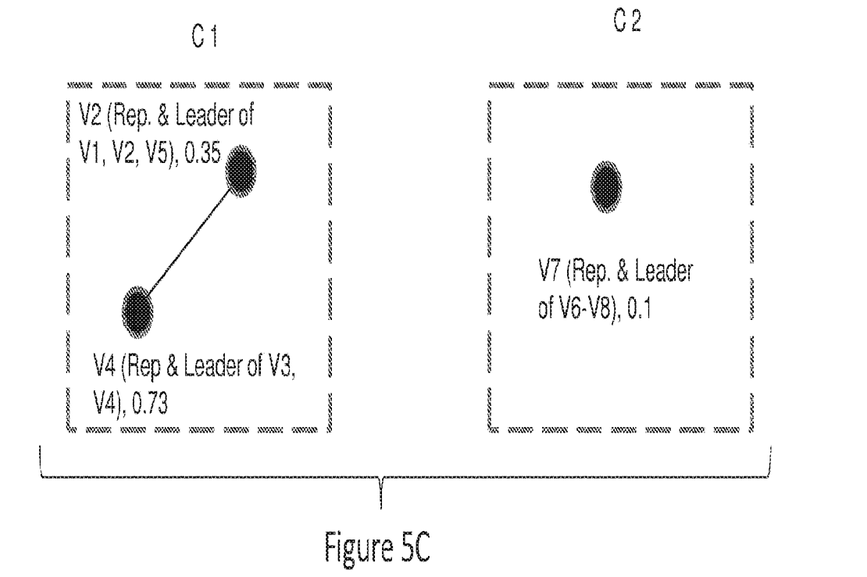

Next, corresponding to step 316, contracted sets of data elements and edges are formed by replacing the vertices in the original input set with their representatives and replacing each edge between data elements by a new edge connecting the representatives of the original pair of data elements. This is illustrated in FIG. 5C, which shows that the contracted set of vertices comprises vertices V2, V4 and V7, where V2 represents V1, V2 and V5, V4 represents V3 and V4, and V7 represents V6, V7 and V8. The edges of the contracted set of edges represent the relations between distinct vertices that are representatives of vertices that were connected by an edge in the input. They are not necessarily a subset of the input edges. In particular, the output set of contracted edges comprises the single new edge (V2, V4) which was not an input edge. It appears as a contracted edge at the output because in the input set V1 and V3 were connected by and edge, V2 represents V1, and V4 represents V3. At this point, the first part of the algorithm of FIG. 3 has contracted the set of input vertices and edges into smaller subsets. Continuing with the algorithm finds the connectivity components in the input set.

Figure 5D:
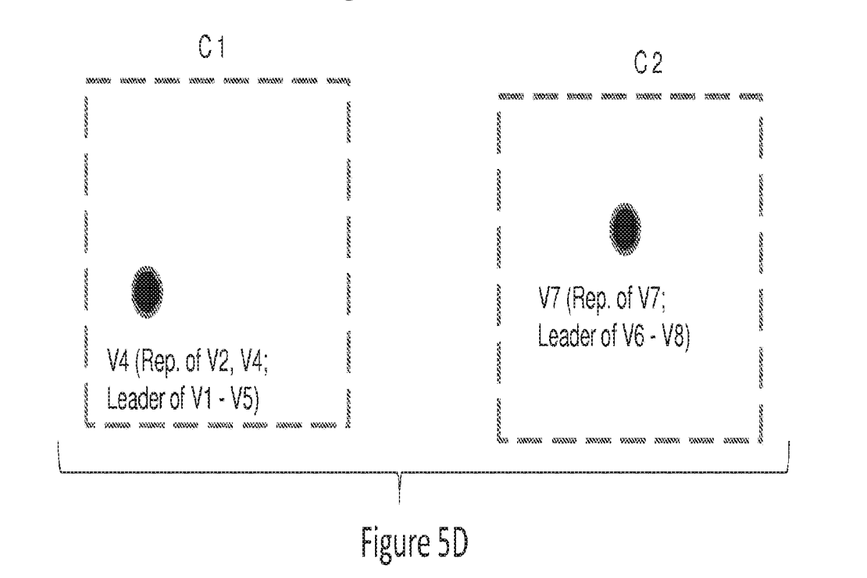

Referring to FIG. 5C, since there is still an edge (V2, V4) in the graph, there are still non-isolated representative vertices present. Accordingly, the algorithm is repeated on the contracted sets to further contract them. Thus, in the second iteration of the algorithm, new random numbers are assigned to the vertices (at 312). Assume that the random number assignments are V2=0.35, V4=0.73 and V7=0.1, as indicated in FIG. 5C. Thus, in the second iteration, V4 has a higher random number than V2, although in the first iteration this was not the case. Accordingly, V4 is selected as the representative of both itself and V2. The result of the second iteration is that there are no longer any relations in the output set. It is an empty set (step 320, FIG. 3), and V4 and V7 are isolated representatives, as shown in FIG. 5D. Thus, at this point, the connectivity components in the input set are known, and may be operated on with SQL queries in the traditional ways: V4 corresponds to connectivity component C1, comprising vertices V1-V5, and V7 corresponds to connectivity component C2, comprising vertices V6-V8. In an actual implementation, there is no need to propagate an isolated vertex, such as V7, into another iteration of the algorithm, as the algorithm does not affect it. Rather, isolated vertices may be output directly, as at step 322.

As described above, if the assignments of vertices to the connectivity components are desired, this may be obtained by retaining at each connected component step the identities of the leader nominated by each vertex, as indicated in FIGS. 5C-D. Likewise, if the sizes of the connectivity components are desired, this can be obtained by weighting each vertex and summing the weights of the vertices represented by each representative. The isolated representative for each connectivity component will indicate its size.

While the foregoing has been with respect to particular embodiments of the invention, it will be appreciated by those skilled in the art that changes to these embodiments may be made without departing from the principles and spirit of the invention, the scope of which is defined by the appended claims.

What is claimed is:

1. A computer-implemented method for determining connectivity components defined by an input set of relations over an input set of data elements, wherein a connectivity component is a subset of the input set data elements that are pair-wise connected such that no other data element of the input set can be added to the subset that is connected to any of the data elements of the subset, and wherein two data elements are connected whenever the two data elements are related by a relation in the set of relations or a path of relations between data elements exists that connects the two data elements, the method comprising:

performing the following actions of selecting and forming iteratively beginning with a set of data elements that is the input set of data elements and a set of relations that is the input set of relations, and at each subsequent iteration using the contracted set of data elements as the set of data elements and the contracted set of relations as the set of relations, until the contracted set of relations is empty:

selecting a respective representative for each data element, each representative being a data element in the set of data elements, to form a contracted set of data elements, the selecting comprising:

assigning a random number to each data element in the set of data elements;

identifying for each data element a respective group of data elements that includes the data element and all other data elements that are related to the data element;

selecting as the respective representative a particular data element in the respective group that has an assigned random number with a predetermined random number position among the data elements in the respective group; and replacing each data element with the representative of the data element to form a contracted set of data elements;

forming a contracted set of relations over the contracted set of data elements, the forming comprising:

defining two representatives in the contracted set of data elements as related in the contracted set of relations if the two representatives represent data elements that were connected in the set of relations; and defining all other pairs of data elements in the contracted set of data elements as not related in the contracted set of relations;

whereby, when the contracted set of relations is empty, each data element in the contracted set of data elements is an isolated data element, an isolated data element being a data element that is not related to any other data element in the contracted set of data elements; and outputting each isolated data element as a respective representative of a respective connectivity component of the input set of data elements, each connectivity component of the input set of data elements being representing by a distinct isolated data element.

2. The method of claim 1, wherein the random number is a pseudorandom number between zero and one.

3. The method of claim 1, wherein the predetermined random number position is the highest random number.

4. The method of claim 1, wherein each data element has a respective weight and a respective leader, the method further comprising:

before performing the actions of selecting and forming:

assigning a common weight to each data element in the input set of data elements; and nominating each data element in the input set of data elements as its own leader.

5. The method of claim 4, wherein selecting a respective representative comprises:

assigning as the weight of each respective representative a sum of the weights of the data elements represented by the respective representative; and for each first data element in the set of data elements, identifying the data elements nominating the first data element and replacing the nominations of the first data element with nominations nominating the representative of the first data element.

6. The method of claim 5, comprising:

outputting the weight of each representative as a size of the connectivity component represented by the representative.

7. The method of claim 6, wherein the common weight is one.

8. The method of claim 6, comprising:

outputting the leader of each data element of the input set of data elements as an identifier of the connectivity component of which the data element is a member.

9. The method of claim 1, comprising:

after each iteration of selecting and forming, outputting each isolated data element in the contracted set of data elements and removing the isolated data element from the set of contracted data elements.

10. Non-transitory computer-readable storage media encoded with computer program instructions for determining connectivity components defined by an input set of relations over an input set of data elements, wherein a connectivity component is a subset of the input set data elements that are pair-wise connected such that no other data element of the input set can be added to the subset that is connected to any of the data elements of the subset, and wherein two data elements are connected whenever the two data elements are related by a relation in the set of relations or a path of relations between data elements exists that connects the two data elements, the instructions when executed by one or more computers causing the one or more computers to perform operations comprising:

performing the following actions of selecting and forming iteratively beginning with a set of data elements that is the input set of data elements and a set of relations that is the input set of relations, and at each subsequent iteration using the contracted set of data elements as the set of data elements and the contracted set of relations as the set of relations, until the contracted set of relations is empty:

selecting a respective representative for each data element, each representative being a data element in the set of data elements, to form a contracted set of data elements, the selecting comprising:

assigning a random number to each data element in the set of data elements;

identifying for each data element a respective group of data elements that includes the data element and all other data elements that are related to the data element;

selecting as the respective representative a particular data element in the respective group that has an assigned random number with a predetermined random number position among the data elements in the respective group; and replacing each data element with the representative of the data element to form a contracted set of data elements;

forming a contracted set of relations over the contracted set of data elements, the forming comprising:

defining two representatives in the contracted set of data elements as related in the contracted set of relations if the two representatives represent data elements that were connected in the set of relations; and defining all other pairs of data elements in the contracted set of data elements as not related in the contracted set of relations;

whereby, when the contracted set of relations is empty, each data element in the contracted set of data elements is an isolated data element, an isolated data element being a data element that is not related to any other data element in the contracted set of data elements; and outputting each isolated data element as a respective representative of a respective connectivity component of the input set of data elements, each connectivity component of the input set of data elements being representing by a distinct isolated data element.

11. The media of claim 10, wherein each data element has a respective weight and a respective leader, the operations further comprising:

before performing the actions of selecting and forming:
  assigning a common weight to each data element in the input set of data elements; and
  nominating each data element in the input set of data elements as its own leader.

12. The media of claim 11, wherein selecting a respective representative comprises:
  assigning as the weight of each respective representative a sum of the weights of the data elements represented by the respective representative; and
  for each first data element in the set of data elements, identifying the data elements nominating the first data element and replacing the nominations of the first data element with nominations nominating the representative of the first data element.

13. The media of claim 12, wherein the operations comprise:
  outputting the weight of each representative as a size of the connectivity component represented by the representative.

14. The media of claim 13, wherein the common weight is one.

15. The media of claim 13, wherein the operations comprise:
  outputting the leader of each data element of the input set of data elements as an identifier of the connectivity component of which the data element is a member.

16. The media of claim 10, wherein the operations comprise:
  after each iteration of selecting and forming, outputting each isolated data element in the contracted set of data elements and removing the isolated data element from the set of contracted data elements.

17. A database system comprising one or more computers programmed for determining connectivity components defined by an input set of relations over an input set of data elements, wherein a connectivity component is a subset of the input set data elements that are pair-wise connected such that no other data element of the input set can be added to the subset that is connected to any of the data elements of the subset, and wherein two data elements are connected whenever the two data elements are related by a relation in the set of relations or a path of relations between data elements exists that connects the two data elements, wherein the one or more computers of the database system are programmed perform operations comprising:

performing the following actions of selecting and forming iteratively beginning with a set of data elements that is the input set of data elements and a set of relations that is the input set of relations, and at each subsequent iteration using the contracted set of data elements as the set of data elements and the contracted set of relations as the set of relations, until the contracted set of relations is empty:

selecting a respective representative for each data element, each representative being a data element in the set of data elements, to form a contracted set of data elements, the selecting comprising:
  assigning a random number to each data element in the set of data elements;
  identifying for each data element a respective group of data elements that includes the data element and all other data elements that are related to the data element;
  selecting as the respective representative a particular data element in the respective group that has an assigned random number with a predetermined random number position among the data elements in the respective group; and
  replacing each data element with the representative of the data element to form a contracted set of data elements;

forming a contracted set of relations over the contracted set of data elements, the forming comprising:
  defining two representatives in the contracted set of data elements as related in the contracted set of relations if the two representatives represent data elements that were connected in the set of relations; and
  defining all other pairs of data elements in the contracted set of data elements as not related in the contracted set of relations;

whereby, when the contracted set of relations is empty, each data element in the contracted set of data elements is an isolated data element, an isolated data element being a data element that is not related to any other data element in the contracted set of data elements; and outputting each isolated data element as a respective representative of a respective connectivity component of the input set of data elements, each connectivity component of the input set of data elements being representing by a distinct isolated data element.

18. The database system of claim 17, wherein each data element has a respective weight and a respective leader, the operations further comprising:

before performing the actions of selecting and forming:
  assigning a common weight to each data element in the input set of data elements; and
  nominating each data element in the input set of data elements as its own leader;

wherein selecting a respective representative comprises:
  assigning as the weight of each respective representative a sum of the weights of the data elements represented by the respective representative; and
  for each first data element in the set of data elements, identifying the data elements nominating the first data element and replacing the nominations of the first data element with nominations nominating the representative of the first data element; and wherein the operations comprise:
  outputting the weight of each representative as a size of the connectivity component represented by the representative; and outputting the leader of each data element of the input set of data elements as an identifier of the connectivity component of which the data element is a member.

* * * * *